United States Patent
Kasamatsu et al.

(10) Patent No.: US 12,283,033 B2
(45) Date of Patent: Apr. 22, 2025

(54) DAMAGE DIAGRAM CREATION SUPPORT METHOD AND DAMAGE DIAGRAM CREATION SUPPORT DEVICE

(71) Applicant: FUJIFILM Corporation, Tokyo (JP)

(72) Inventors: Tadashi Kasamatsu, Ashigarakami-gun (JP); Makoto Yonaha, Tokyo (JP); Naoko Yoshida, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 285 days.

(21) Appl. No.: 18/050,846

(22) Filed: Oct. 28, 2022

(65) Prior Publication Data

US 2023/0075504 A1    Mar. 9, 2023

Related U.S. Application Data

(63) Continuation of application No. PCT/JP2021/019704, filed on May 25, 2021.

(30) Foreign Application Priority Data

May 29, 2020  (JP) ................................. 2020-094329

(51) Int. Cl.
 *G06T 7/13*    (2017.01)
 *G06T 7/00*    (2017.01)

(52) U.S. Cl.
 CPC .............. *G06T 7/0002* (2013.01); *G06T 7/13* (2017.01)

(58) Field of Classification Search
 CPC ................................ G06T 7/0002; G06T 7/13
 See application file for complete search history.

(56) References Cited

U.S. PATENT DOCUMENTS

| | | |
|---|---|---|
| 10,746,625 B2 | 8/2020 | Santra et al. |
| 2003/0179084 A1 | 9/2003 | Skrbina et al. |
| 2005/0110672 A1 | 5/2005 | Cardiasmenos et al. |
| 2008/0195330 A1 | 8/2008 | Hara et al. |

(Continued)

FOREIGN PATENT DOCUMENTS

| | | |
|---|---|---|
| CN | 101950436 A | 1/2011 |
| CN | 102095755 A | 6/2011 |

(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2021/019704, dated Dec. 8, 2022.

(Continued)

*Primary Examiner* — Sam Bhattacharya
(74) *Attorney, Agent, or Firm* — Birch, Stewart, Kolasch & Birch, LLP

(57) ABSTRACT

Provided is a damage diagram creation support method, which includes: acquiring information on a region having internal damage to a structure within an inspection target region; acquiring a visible light image obtained by imaging the inspection target region with a visible light camera; detecting fissuring appearing on a surface of the structure in the visible light image; and creating a damage diagram in which the fissuring detected in the visible light image is traced. Also provided is a damage diagram creation support device capable of appropriately recording a detection result of fissuring automatically detected from an image.

10 Claims, 10 Drawing Sheets

(56) References Cited

U.S. PATENT DOCUMENTS

| | | |
|---|---|---|
| 2011/0181881 A1 | 7/2011 | Mathur et al. |
| 2013/0176424 A1 | 7/2013 | Weil |
| 2013/0250070 A1 | 9/2013 | Takayama |
| 2017/0307746 A1 | 10/2017 | Rohani et al. |
| 2019/0003830 A1 | 1/2019 | Irie |
| 2020/0018854 A1 | 1/2020 | Hicks et al. |
| 2020/0025877 A1 | 1/2020 | Sarkis et al. |
| 2021/0209422 A1 | 7/2021 | Horita |
| 2021/0405182 A1 | 12/2021 | Reynolds et al. |

FOREIGN PATENT DOCUMENTS

| | | |
|---|---|---|
| CN | 101614814 B | 2/2012 |
| CN | 105068065 A | 11/2015 |
| JP | 7-151719 A | 6/1995 |
| JP | 11-83754 A | 3/1999 |
| JP | 11-83996 A | 3/1999 |
| JP | 11-259656 A | 9/1999 |
| JP | 2000-193611 A | 7/2000 |
| JP | 2002-257744 A | 9/2002 |
| JP | 2002-350365 A | 12/2002 |
| JP | 2004-212104 A | 7/2004 |
| JP | 2004-325246 A | 11/2004 |
| JP | 2005-16995 A | 1/2005 |
| JP | 2005-37366 A | 2/2005 |
| JP | 2006-108473 A | 4/2006 |
| JP | 2007-121214 A | 5/2007 |
| JP | 2007-178384 A | 7/2007 |
| JP | 2007-183227 A | 7/2007 |
| JP | 2006-132973 A | 5/2008 |
| JP | 2008-145298 A | 6/2008 |
| JP | 2008-151809 A | 7/2008 |
| JP | 2008-203123 A | 9/2008 |
| JP | 2011-39690 A | 2/2011 |
| JP | 2011-133322 A | 7/2011 |
| JP | 2012-202859 A | 10/2012 |
| JP | 2013-250059 A | 12/2013 |
| JP | 2014-6222 A | 1/2014 |
| JP | 2015-219014 A | 12/2015 |
| JP | 2016-111414 A | 6/2016 |
| JP | 2017-138239 A | 8/2017 |
| JP | 2016-6398 A | 1/2018 |
| JP | 2018-54319 A | 4/2018 |
| JP | 2018-185228 A | 11/2018 |
| JP | 2019-27908 A | 2/2019 |
| JP | 2019-39849 A | 3/2019 |
| JP | 2019-70627 A | 5/2019 |
| JP | 2019-130927 A | 8/2019 |
| JP | 2019-144191 A | 8/2019 |
| JP | 2019-158793 A | 9/2019 |
| JP | 2020-16667 A | 1/2020 |
| JP | 2020-24184 A | 2/2020 |
| JP | 2020-504811 A | 2/2020 |
| JP | 2020-51851 A | 4/2020 |
| JP | 2020-63969 A | 4/2020 |
| JP | 2020-71863 A | 5/2020 |
| KR | 10-1492336 B1 | 2/2015 |
| WO | WO 2012/073722 A1 | 6/2012 |
| WO | WO2017/119154 A1 | 7/2017 |
| WO | WO 2017/154731 A1 | 9/2017 |
| WO | WO 2018/037689 A1 | 3/2018 |
| WO | WO2020/059706 A1 | 3/2020 |

OTHER PUBLICATIONS

International Search Report (Form PCT/ISA/210) for International Application No. PCT/JP2021/019704, dated Aug. 3, 2021, with English translation.
U.S. Appl. No. 18/050,709, filed Oct. 28, 2022, Not Yet Assigned.
U.S. Appl. No. 18/050,911, filed Oct. 28, 2022, Not Yet Assigned.
U.S. Appl. No. 18/050,833, filed Oct. 28, 2022, Not Yet Assigned.
U.S. Appl. No. 18/050,848, filed Oct. 28, 2022, Not Yet Assigned.
Japanese Office Action for Japanese Application No. 2022-526555, dated Dec. 12, 2023, with English translation.
U.S. Notice of Allowance for U.S. Appl. No. 18/050,833, dated Nov. 25, 2024.
International Preliminary Report on Patentability and Written Opinion of the International Searching Authority (Forms PCT/IPEA/409 and PCT/ISA/237) for International Application No. PCT/ JP2021/019702, dated Apr. 8, 2022, with an English translation.
International Preliminary Report on Patentability and Written Opinion of the International Searching Authority (Forms PCT/IPEA/409 and PCT/ISA/237) for Application No. PCT/JP2021/019700, dated Jan. 28, 2022, with an English translation.
International Preliminary Report on Patentability and Written Opinion of the International Searching Authority (Forms PCT/IPEA/409 and PCT/ISA/237) for Application No. PCT/JP2021/019703, dated Mar. 4, 2022, with an English translation.
International Preliminary Report on Patentability and Written Opinion of the International Searching Authority (Forms PCT/IPEA/409 and PCT/ISA/237) for International Application No. PCT/JP2021/ 019701, dated Jan. 28, 2022 with an English translation.
International Search Report (Form PCT/ISA/210) for International Application No. PCT/JP2021/019702. dated Aug. 17, 2021, with English translation.
International Search Report (Form PCT/ISA/210) for International Application No. PCT/JP2021/019700, dated Aug. 17, 2021, with an English translation.
International Search Report (Form PCT/ISA/210) for International Application No. PCT/JP2021/019703, dated Aug. 17, 2021, with an English translation.
International Search Report (Form PCT/ISA/210) for International Application No. PCT/JP2021/019701, dated Aug. 17, 2021, with English translation.
Japanese Office Action for Japanese Application No. 2022-526554, dated Jan. 24, 2024, with English translation.
U.S. Office Action for U.S. Appl. No. 18/050,709, dated Feb. 24, 2025.

DAMAGE DIAGRAM CREATION SUPPORT METHOD AND DAMAGE DIAGRAM CREATION SUPPORT DEVICE

CROSS-REFERENCE TO RELATED APPLICATIONS

The present application is a Continuation of PCT International Application No. PCT/JP2021/019704 filed on May 25, 2021 claiming priority under 35 U.S.C § 119(a) to Japanese Patent Application No. 2020-094329 filed on May 29, 2020. Each of the above applications is hereby expressly incorporated by reference, in its entirety, into the present application.

BACKGROUND OF THE INVENTION

1. Field of the Invention

The present invention relates to a damage diagram creation support method and a damage diagram creation support device, and particularly to a damage diagram creation support method and a damage diagram creation support device that support creation of a damage diagram on the basis of an inspection result of a structure.

2. Description of the Related Art

A technique of automatically detecting and displaying damage (deformation), such as fissuring, through image processing on an image obtained by imaging a surface of a structure is known (for example, JP2014-6222A).

SUMMARY OF THE INVENTION

However, conventionally, there is a problem that more information than necessary is displayed because detected damage is uniformly displayed in this type of automatic damage detection technique. For example, in recent years, improvements in detection accuracy for fissuring have made it possible to detect finer fissuring, but there is a problem that it becomes difficult to confirm the result in a case where fissuring above the required level is displayed. On the other hand, there is also a case where it is desired to confirm fine fissuring depending on a location even within the same inspection target region. For example, it is necessary to confirm a surface state in detail for a region having internal damage.

The present invention has been made in view of such circumstances, and an object of the present invention is to provide a damage diagram creation support method and a damage diagram creation support device capable of appropriately recording a detection result of fissuring automatically detected from an image.

(1) A damage diagram creation support method comprising: a step of acquiring information on a region having internal damage to a structure within an inspection target region; a step of acquiring a visible light image obtained by imaging the inspection target region with a visible light camera; a step of detecting fissuring appearing on a surface of the structure in the visible light image; and a step of creating a damage diagram in which the fissuring detected in the visible light image is traced, in which the damage diagram is created by tracing fissuring with a width greater than or equal to a first threshold value in a region except for the region having internal damage and by tracing fissuring with a width greater than or equal to a second threshold value, which is smaller than the first threshold value, in the region having internal damage.

(2) The damage diagram creation support method of (1), in which the visible light image is an image captured with a pixel resolution capable of detecting fissuring with at least a width of up to 0.1 mm, the first threshold value is 0.2 mm, and the second threshold value is 0.1 mm.

(3) The damage diagram creation support method of (1), further comprising: a step of detecting the region having internal damage by non-destructively measuring an internal state of the inspection target region.

(4) The damage diagram creation support method of (3), in which the internal state of the inspection target region is non-destructively measured by capturing an image that visualizes the internal state of the inspection target region.

(5) The damage diagram creation support method of (4), in which the image that visualizes the internal state of the inspection target region is captured using an electromagnetic wave or an ultrasonic wave.

(6) The damage diagram creation support method of (5), in which the image that visualizes the internal state of the inspection target region is captured using a millimeter wave, a microwave, or a terahertz wave.

(7) The damage diagram creation support method of (2), in which an internal state of the inspection target region is measured by a non-contact acoustic exploration method.

(8) The damage diagram creation support method of any one of (1) to (7), in which a delamination region is detected as the region having internal damage to the structure.

(9) A damage diagram creation support device that supports creation of a damage diagram in which fissuring appearing on a surface of a structure is recorded, the device comprising: a processor, in which the processor executes processing of acquiring information on a region having internal damage to the structure within an inspection target region; processing of acquiring a visible light image obtained by imaging the inspection target region with a visible light camera; processing of detecting the fissuring appearing on the surface of the structure in the visible light image; and processing of creating a damage diagram in which the fissuring detected in the visible light image is traced, in which the damage diagram is created by tracing fissuring with a width greater than or equal to a first threshold value in a region except for the region having internal damage and by tracing fissuring with a width greater than or equal to a second threshold value, which is smaller than the first threshold value, in the region having internal damage.

(10) The damage diagram creation support device of (9), in which the visible light image is an image captured with a pixel resolution capable of detecting fissuring with at least a width of up to 0.1 mm, the first threshold value is 0.2 mm, and the second threshold value is 0.1 mm.

According to the present invention, it is possible to appropriately record a detection result of fissuring automatically detected from an image.

DESCRIPTION OF THE PREFERRED EMBODIMENTS

Hereinafter, preferred embodiments of the present invention will be described with reference to the accompanying drawings.

[Damage Diagram Creation Support Device]

Figure 1:
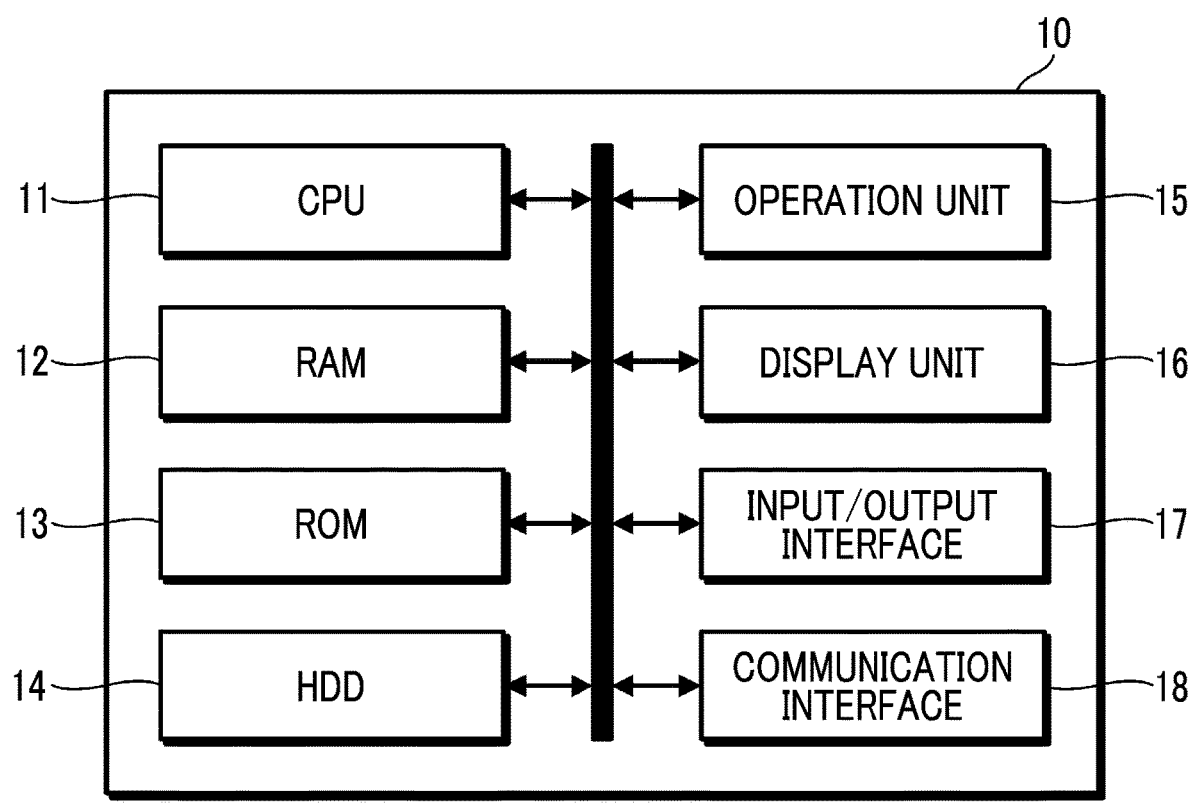
FIG. 1 is a block diagram showing an example of a hardware configuration of a damage diagram creation support device.

FIG. 1 is a block diagram showing an example of the hardware configuration of a damage diagram creation support device.

As shown in FIG. 1, a damage diagram creation support device 10 comprises a central processing unit (CPU) 11, a random access memory (RAM) 12, a read only memory (ROM) 13, a hard disk drive (HDD) 14, an operation unit 15, a display unit 16, an input/output interface (IF) 17, a communication interface 18, and the like. That is, the damage diagram creation support device 10 is composed of a computer, and the computer functions as the damage diagram creation support device 10 by executing a predetermined program. For example, a general-purpose computer, such as a personal computer, can be used as the computer that constitutes the damage diagram creation support device 10. The CPU 11 is an example of the processor. Various kinds of data and a program executed by the CPU 11 are stored in the ROM 13 and/or the HDD 14. The operation unit 15 includes, for example, a keyboard and a mouse. The display unit 16 includes, for example, a liquid crystal display (LCD) and an organic EL display (organic light emitting diode display, OLED display).

Figure 2:
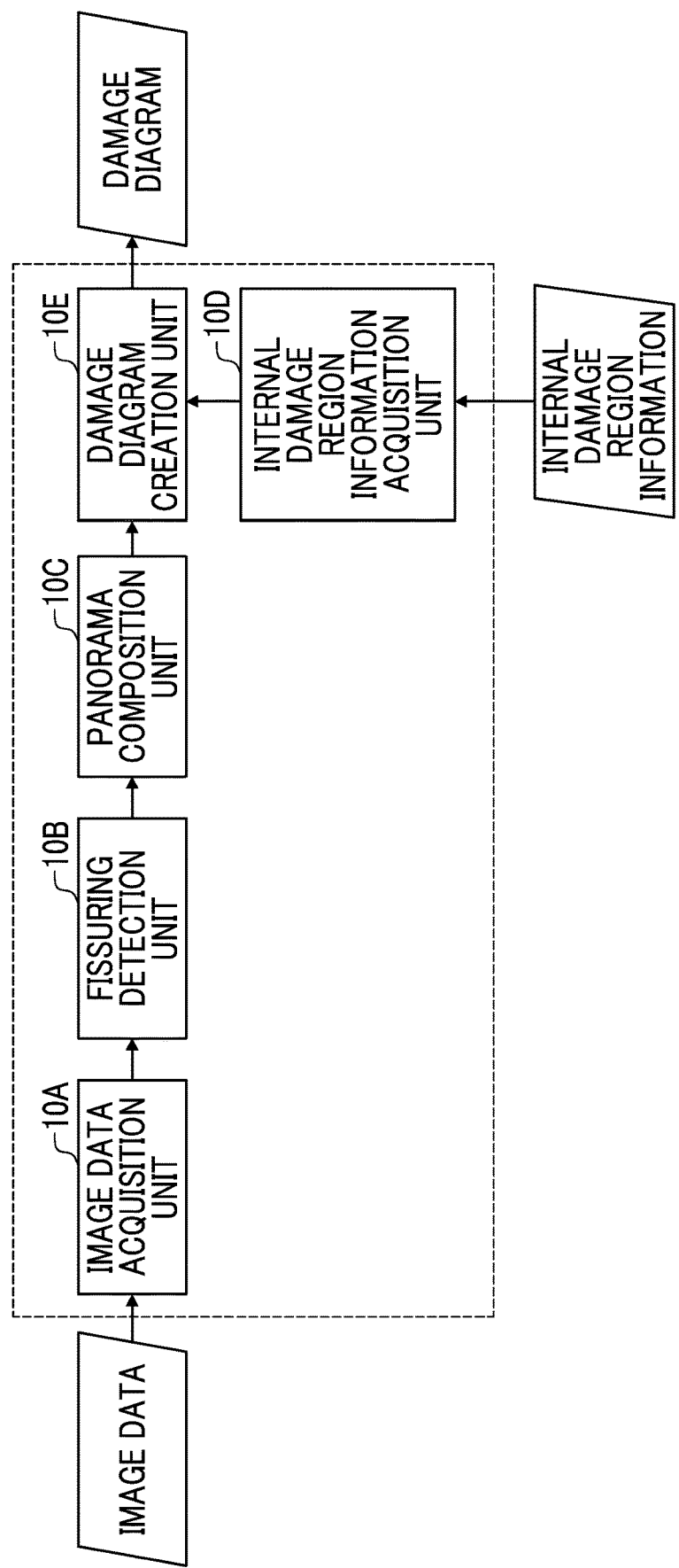
FIG. 2 is a block diagram of a main function of the damage diagram creation support device.

FIG. 2 is a block diagram of the main function of the damage diagram creation support device.

As shown in FIG. 2, the damage diagram creation support device 10 has functions, such as an image data acquisition unit 10A, a fissuring detection unit 10B, a panorama composition unit 10C, an internal damage region information acquisition unit 10D, and a damage diagram creation unit 10E. These functions are realized by the CPU 11 executing a predetermined program.

The image data acquisition unit 10A acquires image data of the visible light image obtained by imaging an inspection target region. The image data acquisition unit 10A acquires the image data of the visible light image via the input/output interface 17 or the communication interface 18. The image data of the acquired visible light image is stored in the HDD 14.

The fissuring detection unit 10B analyzes the visible light image and detects fissuring appearing on the surface of the structure. Various methods can be adopted for detecting fissuring. For example, it is possible to adopt a method of detecting fissuring using a trained model that has performed machine learning using an image including fissuring, as training data. The type of machine learning algorithm is not particularly limited, and for example, an algorithm using neural networks, such as a recurrent neural network (RNN), a convolutional neural network (CNN), or a multilayer perceptron (MLP), can be used. Alternatively, for example, a method of detecting fissuring on the basis of the brightness distribution and the RGB value distribution of the image can also be adopted. Since a region having fissuring has brightness distribution and RGB value distribution different from other regions, fissuring can be detected from the image by searching for changes in the brightness value and the RGB value.

The fissuring detection unit 10B measures the width of the detected fissuring at the same time as detecting the fissuring. A well-known image measurement technique can be adopted to measure the width of fissuring.

The panorama composition unit 10C generates a single image by performing panorama composition in a case where an image data group of visible light images obtained by split imaging is acquired. The split imaging is a method of dividing the inspection target region into a plurality of regions and imaging each region. At the time of imaging, imaging is performed by partially overlapping adjacent regions with each other. The panorama composition unit 10C generates a single image by splicing the images obtained by imaging each region. Since the panorama composition itself is a well-known technique, detailed description thereof will be omitted. The panorama composition unit 10C performs panorama composition processing by performing corrections on each image, such as an enlargement/reduction correction, a tilt correction, and a rotation correction, as necessary. Fissuring detection can also be performed on an image after panorama composition.

The internal damage region information acquisition unit 10D acquires information on a region having internal damage to the structure (internal damage region) within the inspection target region. In the present embodiment, the information on the internal damage region is acquired using a visible light image obtained by imaging the inspection target region. Specifically, the information on the internal damage region is acquired by displaying the visible light image obtained by imaging the inspection target region on the display unit 16 and by receiving designation of the internal damage region on a screen.

Figure 3:
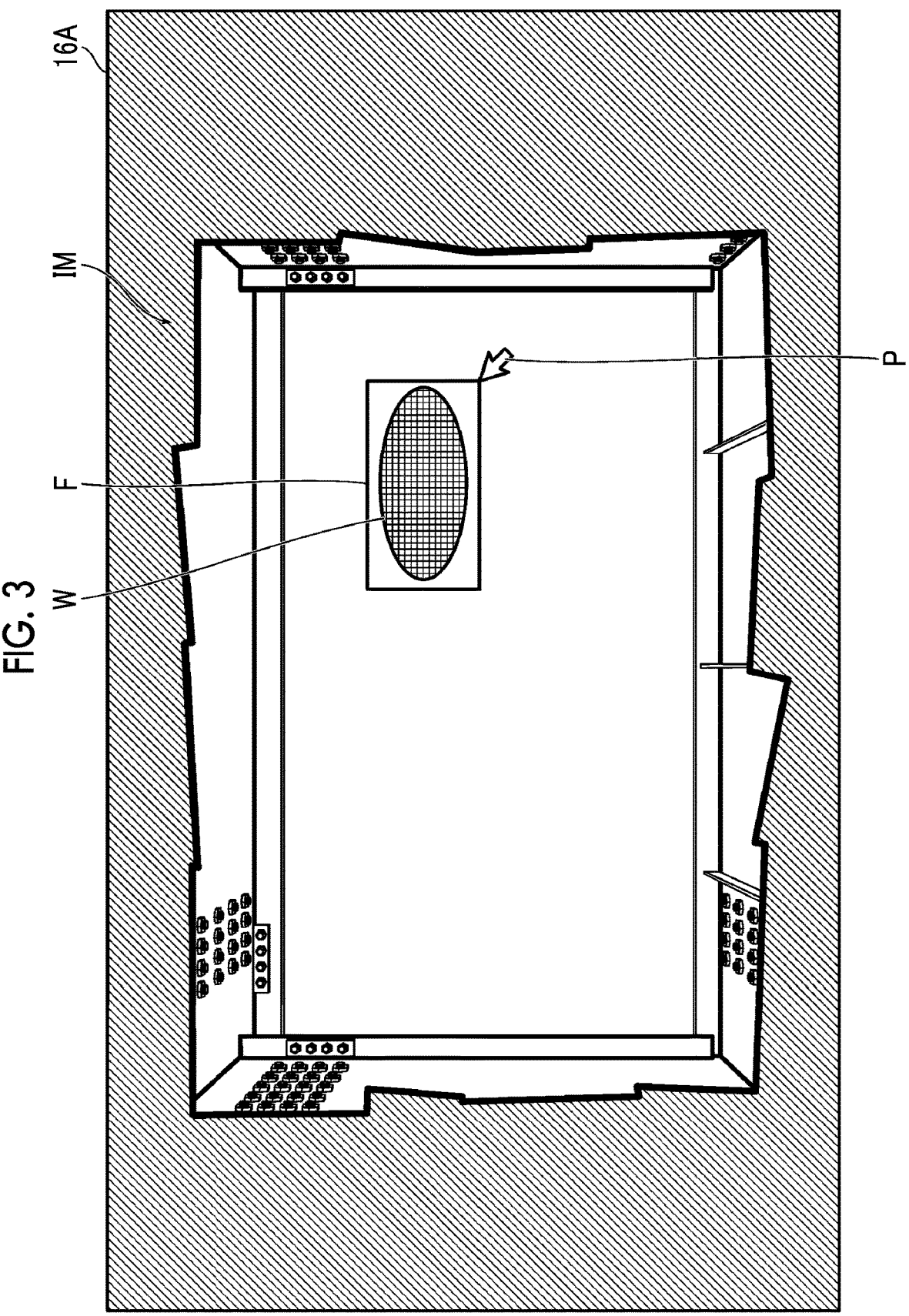
FIG. 3 is a diagram showing an example of a display of a screen for designating an internal damage region.

FIG. 3 is a diagram showing an example of a display of the screen for designating the internal damage region. FIG. 3 shows an example of a case where one coffer of a floor slab in a bridge is imaged. That is, FIG. 3 shows an example of a case where one coffer of the floor slab is set as the inspection target region.

As shown in FIG. 3, a screen 16A of the display unit 16 displays a visible light image IM obtained by imaging the inspection target region. In a case where split imaging is performed on the inspection target region, the panorama composite image is displayed on the display unit 16. FIG. 3 shows an example of a case where the panorama composite image is displayed. A user operates a pointer P via the operation unit 15 to designate the position and the range of the internal damage region on the screen 16A of the display unit 16. FIG. 3 shows an example of a case where the internal damage region is designated by surrounding the internal damage region with a rectangular frame F. A symbol W schematically indicates internal damage.

The damage diagram creation unit 10E creates a damage diagram in which information on fissuring is recorded. In the present embodiment, the damage diagram is created by tracing fissuring on the visible light image obtained by imaging the inspection target region. Therefore, the damage diagram creation unit 10E creates the damage diagram on the basis of the fissuring detection result through the fissuring detection unit 10B. Further, in creating the damage diagram, the damage diagram creation unit 10E creates the damage diagram on the basis of the information on the internal damage region acquired by the internal damage region information acquisition unit 10D. Specifically, fissuring with a width of a first threshold value or more is traced in a region except for the internal damage region. Meanwhile, fissuring with a width of a second threshold value or more is traced in the internal damage region. The relationship between the first threshold value and the second threshold value is the first threshold value>the second threshold value. That is, the second threshold value is set to a value smaller than the first threshold value. In the present embodiment, the first threshold value is set to 0.2 mm, and the second threshold value is set to 0.1 mm. Therefore, the damage diagram is created by tracing fissuring with a width of 0.2 mm or more in the region except for the internal damage region and by tracing fissuring with a width of 0.1 mm or more in the internal damage region.

The created damage diagram is displayed on the display unit 16. Further, the damage diagram is recorded in the HDD 14 in response to an instruction from the user. In recording the damage diagram in the HDD 14, the image data of the visible light image is also recorded. The image data of the visible light image is recorded in the HDD 14 in association with the damage diagram.

[Procedure from Inspection to Creation of Damage Diagram (Damage Diagram Creation Support Method)]

Here, a case of inspecting (checking) a bridge, particularly a floor slab of the bridge, will be described as an example. The bridge is an example of the structure. Further, the floor slab is an example of the structure made of reinforced concrete.

Figure 4:
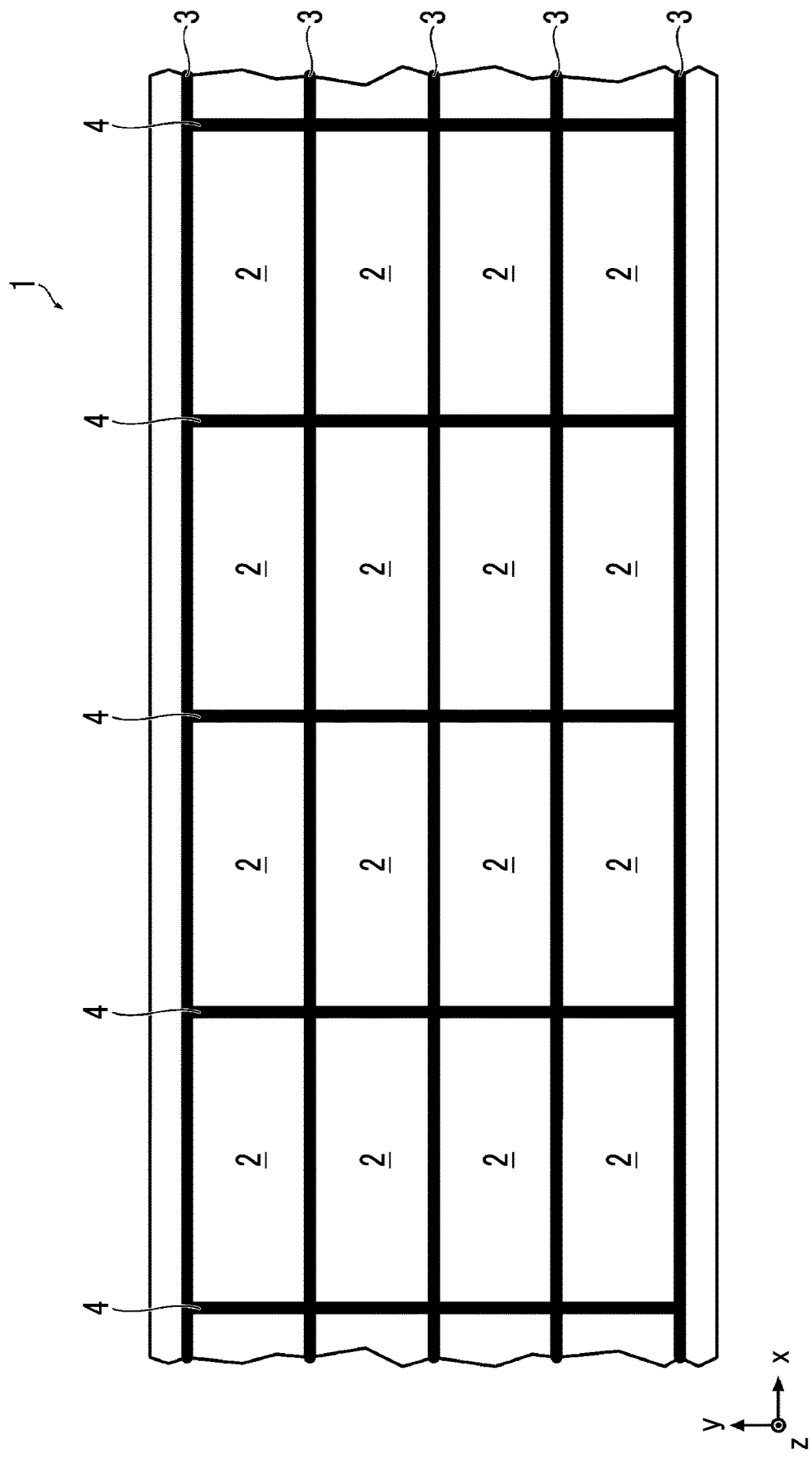
FIG. 4 is a plan view showing a schematic configuration of a floor slab.

FIG. 4 is a plan view showing the schematic configuration of the floor slab.

In general, a floor slab 1 is inspected in a coffer unit. Therefore, each coffer 2, 2, . . . is set as the inspection target region. The coffer 2 is a compartment of the floor slab 1 divided by a main girder 3 and a cross-beam 4. In FIG. 4, in the in-plane of the floor slab 1, a longitudinal direction (the direction of the main girder 3) of the floor slab 1 is set as an x direction, and a direction (the direction of the cross-beam 4) orthogonal to the x direction is set as a y direction. In addition, a direction (vertically downward direction) orthogonal to the floor slab 1 is set as a z direction.

Figure 5:
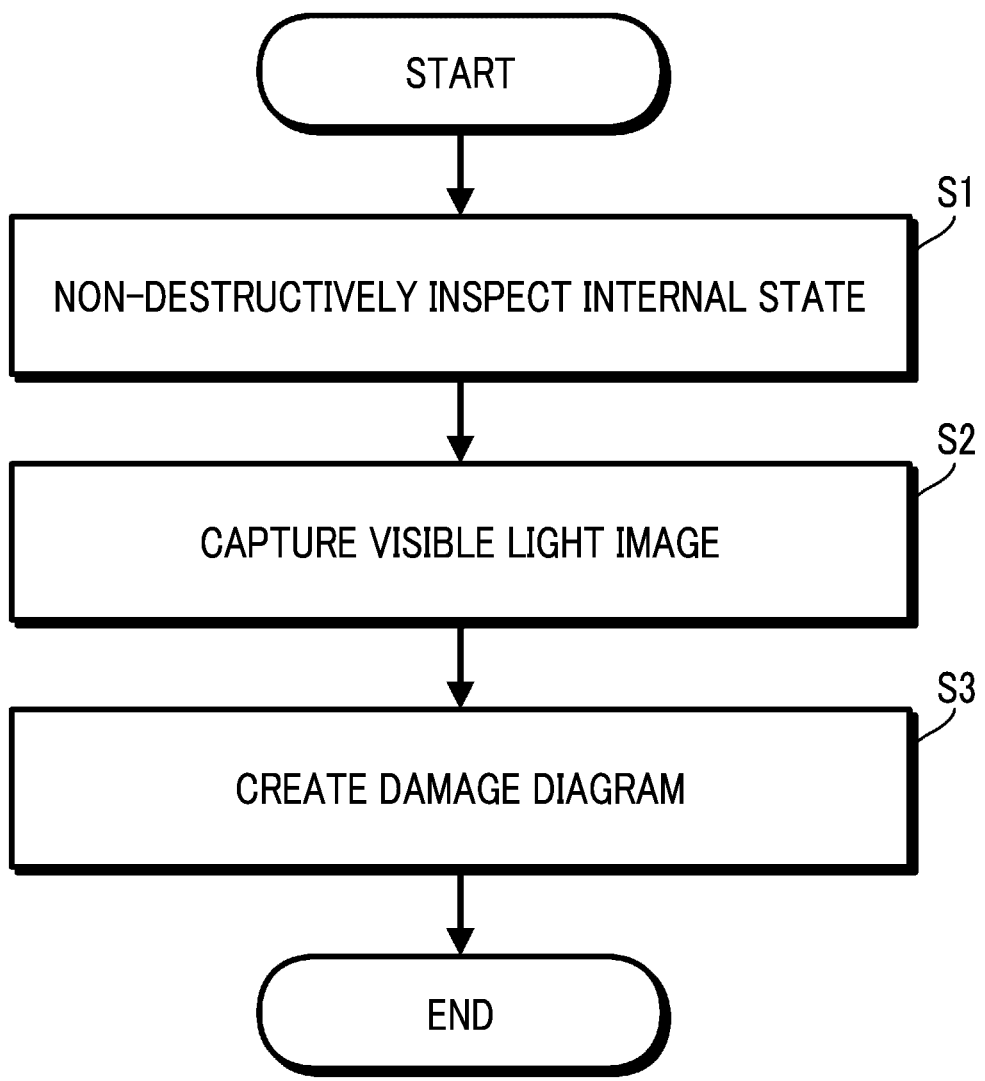
FIG. 5 is a flowchart showing a procedure from inspection to creation of a damage diagram.

FIG. 5 is a flowchart showing a procedure from inspection to creation of the damage diagram.

First, the internal state of the inspection target region is non-destructively inspected (step S1). Next, the inspection target region is imaged with the visible light camera (step S2). Next, the captured visible light image is taken into the damage diagram creation support device 10, whereby the damage diagram is created (step S3). Hereinafter, each step will be described in detail.

(1) S1: Inspection of Internal State

In the present embodiment, the internal state of the inspection target region is non-destructively measured by capturing an image that visualizes the internal state of the inspection target region.

In the present embodiment, a millimeter wave camera (millimeter wave imaging device) is used to capture an image (millimeter wave image) that visualizes the internal state of the inspection target region. For example, an active millimeter wave camera can be used as the millimeter wave camera. The active millimeter wave camera irradiates the subject with a millimeter wave, receives the reflected wave, and generates the image that visualizes the internal state of the subject. The millimeter wave is an electromagnetic wave with a wavelength of 1 to 10 mm and a frequency of 30 to 300 GHz. The millimeter wave camera, for example, electronically or mechanically scans the subject with a millimeter wave beam to generate a two-dimensional image of the internal state of the subject within the angle of view. A plurality of transmitting antennas and a plurality of receiving antennas are used so that imaging can be speeded up. For example, the two-dimensional image can be generated by arranging the plurality of receiving antennas in one direction and scanning the subject in a direction orthogonal to the arrangement direction. In a case where the plurality of transmitting antennas and the plurality of receiving antennas are used, resolution can be improved by adopting a so-called multiple input multiple output (MIMO) radar technology. MIMO is a technology that generates more virtual receiving antennas than the number of installed receiving antennas by transmitting signals from the plurality of antennas.

In a case where the entire inspection target region cannot be imaged in single imaging, imaging is performed a plurality of times while shifting the imaging location. That is, split imaging is performed.

It is possible to detect internal damage that cannot be detected from the outer appearance by capturing the millimeter wave image. In the present embodiment, in particular, delamination of concrete is detected as the internal damage. The delamination of concrete refers to a state in which the vicinity of the surface of concrete is delaminated. The delamination of concrete means a state in which the concrete in the vicinity of the surface loses its integrity with the internal concrete due to continuous fissuring occurring inside the concrete or the like.

(2) S2: Capturing of Visible Light Image

The visible light image is captured using the visible light camera. The visible light camera is a camera that images the subject with sensitivity in a visible light wavelength range (generally from 380 nm to 780 nm). As the visible light camera, a general digital camera (including a camera mounted on a mobile terminal or the like) on which a complementary metal-oxide semiconductor device image sensor (CMOS image sensor), a charge coupled device image sensor (CCD image sensor) or the like is mounted can be used. In the present embodiment, a digital camera capable of color imaging is used. Therefore, a color image is captured as the visible light image. The color image is an image (a so-called RGB image) having respective intensity values (brightness values) of red (R), green (G), and blue (B) in a pixel unit.

In a case where the entire inspection target region cannot be imaged in single imaging, imaging is performed a plurality of times while shifting the imaging location. That is, split imaging is performed.

Figure 6:
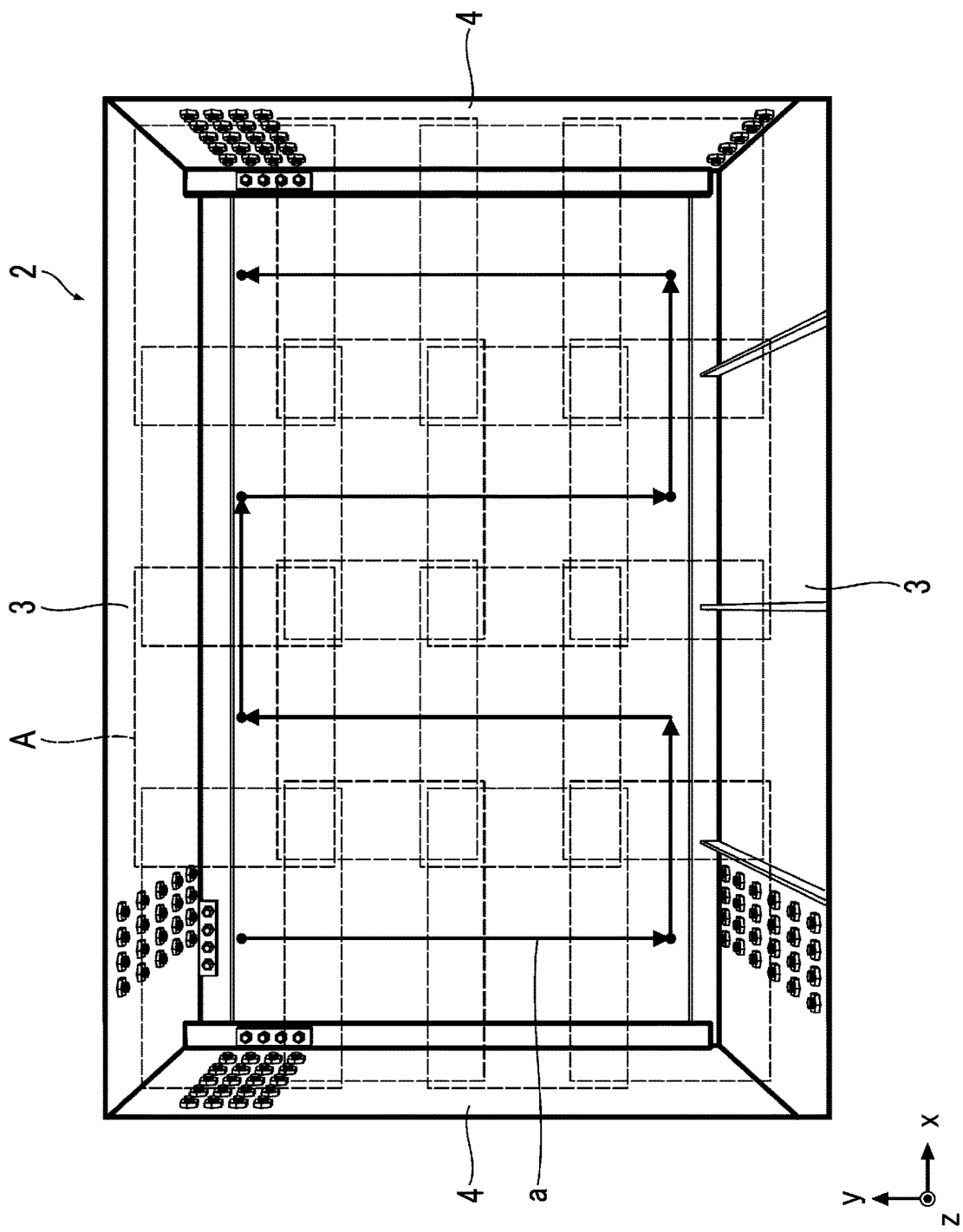
FIG. 6 is a diagram showing an example of an imaging method for split imaging.

FIG. 6 is a diagram showing an example of an imaging method for split imaging.

In FIG. 6, a frame with a broken line indicated by a symbol A is a frame that indicates a single imaging range (visual field of the visible light camera). The example shown in FIG. 6 shows a situation in which the coffer 2, which is the inspection target region, is imaged while sequentially moving in the y direction and the x direction. An arrow a in FIG. 6 indicates the movement direction.

A photographer (inspection engineer) faces the floor slab and performs imaging from a certain distance. In addition, imaging is performed such that adjacent imaging regions are partially overlapped with each other. For example, imaging is performed such that adjacent imaging regions are overlapped with each other by 30% or more. With this, images can be appropriately combined in performing panorama composition.

Imaging is performed with a predetermined pixel resolution. Imaging is performed with a pixel resolution capable of detecting fissuring with at least a width of the second threshold value or more from the captured visible light image. In the present embodiment, since the second threshold value is 0.1 mm, imaging is performed with a pixel resolution capable of detecting fissuring with at least a width of 0.1 mm or more from the captured visible light image. More specifically, imaging is performed with a pixel resolution capable of detecting fissuring with a width of 0.1 mm or more in the fissuring detection unit 10B of the damage diagram creation support device 10.

Here, the "pixel resolution" refers to the visual field size per pixel of the image sensor mounted on the visible light camera. The pixel resolution indicates how many millimeters one pixel of the image sensor corresponds to. The unit is "mm/pixel".

The pixel resolution is determined by the visual field size and the number of pixels. The "visual field size" is the range (imaging range) in which the inspection target object is imaged. The relationship between the pixel resolution, the visual field size, and the number of pixels is represented by the following equations.

Pixel resolution in the vertical direction=visual field size(*mm*) in the vertical direction/the number of pixels in the vertical direction of the image sensor Pixel resolution in the horizontal direction=visual field size (*mm*) in the horizontal direction/the number of pixels of the image sensor in the horizontal direction In a case where the pixels of the image sensor are square pixels, the pixel resolution in the vertical direction and the pixel resolution in the horizontal direction are the same.

As described above, in the present embodiment, imaging is performed with a pixel resolution capable of detecting fissuring with a width of up to 0.1 mm from the captured visible light image. The pixel resolution capable of detecting fissuring with at least a width of up to 0.1 mm from the captured visible light image is, for example, 0.3 [mm/pixel].

As an example, it is assumed that the number of pixels of the image sensor mounted on the visible light camera used is 3000 pixels in the vertical direction and 4000 pixels in the horizontal direction. In this case, the visual field size for performing imaging on a condition of a pixel resolution of 0.3 [mm/pixel] is set as follows.

Visual field size in the vertical direction: 0.3 mm×3000 pixels=900 [mm]
Visual field size in the horizontal direction: 0.3 mm×4000 pixels=1200 [mm]

(3) S3: Creation of Damage Diagram

The damage diagram is created using the damage diagram creation support device 10. The user (inspection engineer) creates the damage diagram by inputting the visible light image of the inspection target region captured by the visible light camera into the damage diagram creation support device 10.

Figure 7:
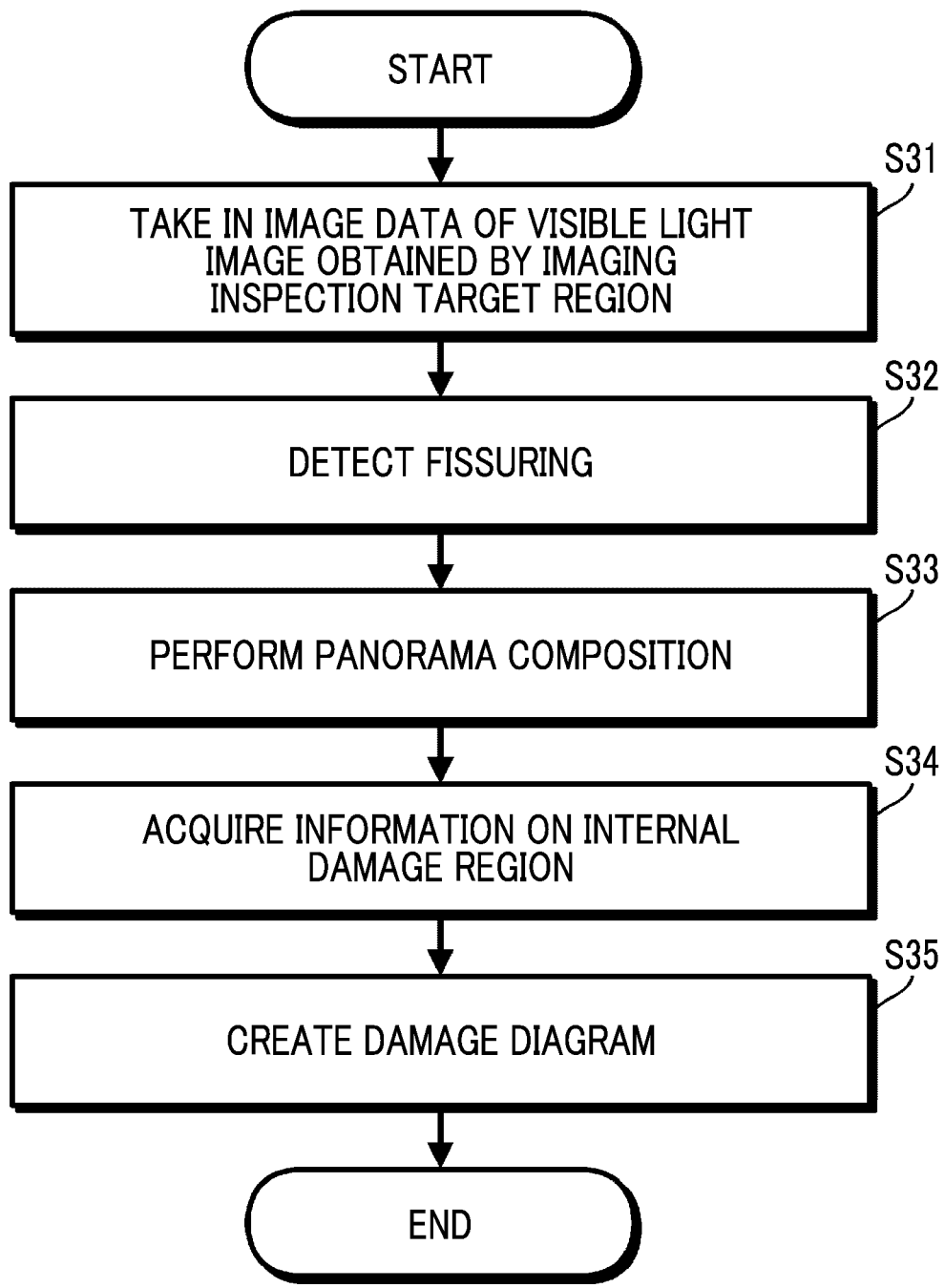
FIG. 7 is a flowchart showing a damage diagram creation procedure through the damage diagram creation support device.

FIG. 7 is a flowchart showing a damage diagram creation procedure through the damage diagram creation support device.

First, the image data of the visible light image obtained by imaging the inspection target region is taken in (step S31). The image data is input to the damage diagram creation support device 10 via the input/output interface 17 or the communication interface 18.

In a case where the image data is input, fissuring detection is performed (step S32). In the present embodiment, fissuring with at least a width of 0.1 mm or more is detected.

In a case where the fissuring detection is completed, panorama composition processing is performed (step S33). This processing is performed only in a case where images obtained by split imaging are input.

Next, information on the internal damage region is acquired (step S34). As described above, in the present embodiment, the visible light image obtained by imaging the inspection target region is displayed on the display unit 16, and designation of the internal damage region is received from the user. The user designates the internal damage region on the basis of the inspection result of the internal state.

Next, the damage diagram is created on the basis of the fissuring detection result and the information on the internal damage region (step S35). The damage diagram is created by tracing fissuring on the visible light image obtained by imaging the inspection target region. At that time, the damage diagram is created by tracing fissuring with a width of 0.2 mm or more in the region except for the internal damage region and by tracing fissuring with a width of 0.1 mm or more in the internal damage region.

Figure 8:
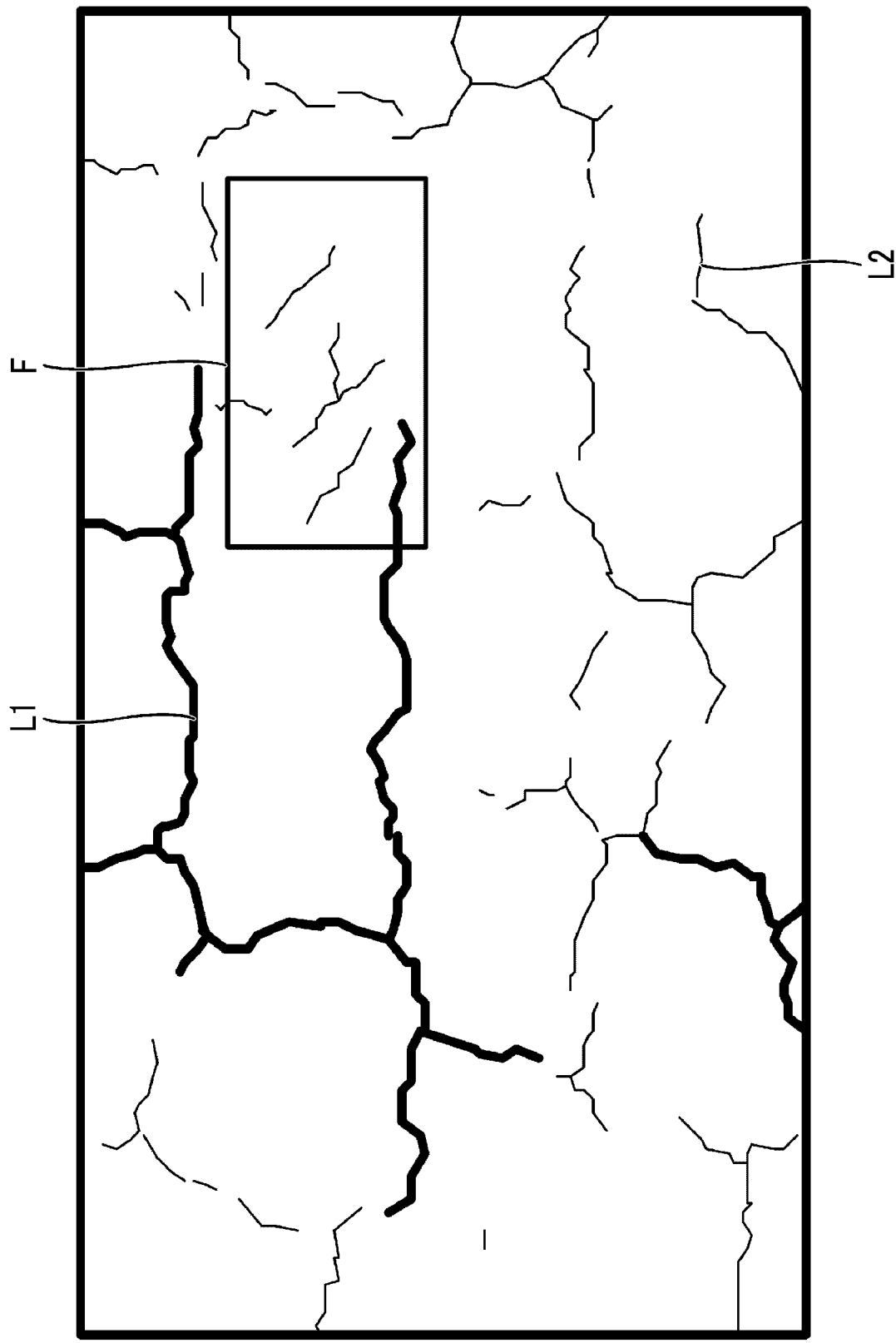
FIG. 8 is a diagram showing an example of a damage diagram created in a case where all fissuring detected on a visible light image is traced.

FIG. 8 is a diagram showing an example of a damage diagram created in a case where all fissuring detected on the visible light image is traced.

In FIG. 8, a thick line L1 indicates a line tracing fissuring with a width of 0.2 mm or more. Meanwhile, a thin line L2 indicates a line tracing fissuring with a width of 0.1 mm or more and less than 0.2 mm. In addition, in FIG. 8, a rectangular frame F indicates the internal damage region.

Figure 9:
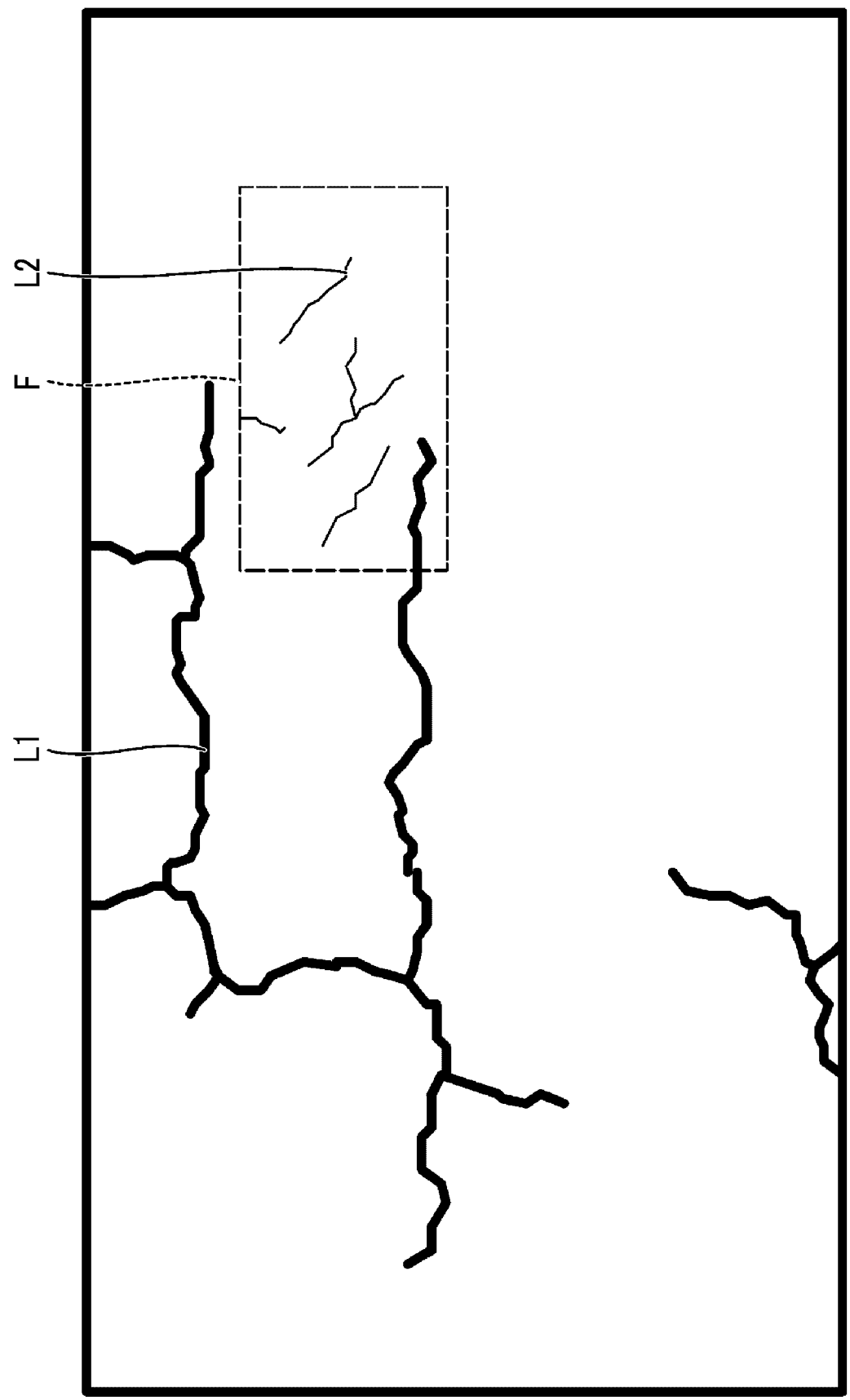
FIG. 9 is a diagram showing an example of a damage diagram created by the damage diagram creation support device.

FIG. 9 is a diagram showing an example of the damage diagram created by the damage diagram creation support device of the present embodiment.

As shown in FIG. 9, in the damage diagram created by the damage diagram creation support device 10 of the present embodiment, fissuring with a width of 0.1 mm or more is displayed only in the internal damage region. That is, fissuring with a width of 0.2 mm or more is displayed as a whole, and fissuring with a width of 0.1 mm or more is displayed only for the internal damage region.

The created damage diagram is displayed on the display unit 16. Further, the damage diagram is recorded in the HDD 14 in response to an instruction from the user. The image data of the visible light image obtained by imaging the inspection target region is also recorded in the HDD 14. The image data of the visible light image is recorded in the HDD 14 in association with the damage diagram.

As described above, with the damage diagram creation support device 10 of the present embodiment, it is possible to create a damage diagram in which fissuring is appropriately recorded according to the application. That is, the detection result of fine fissuring (fissuring with a width of less than 0.2 mm) is displayed only for a region where the surface properties need to be confirmed in detail. With this, an easy-to-confirm damage diagram can be created.

Modification Example

[Detection of Fissuring]

In the above embodiment, a configuration is adopted in which fissuring with a width of 0.1 mm or more (fissuring with a width of the second threshold value or more) is detected in all regions of the inspection target region, but a configuration may be adopted in which fissuring is detected by separating the internal damage region and the region except for the internal damage region. In this case, fissuring with a width of 0.1 mm or more is detected in the internal damage region, and fissuring with a width of 0.2 mm or more is detected in the region except for the internal damage region.

[Creation of Damage Diagram]

The damage diagram (see FIG. 8) in which fissuring with a width of 0.1 mm or more is recorded in all regions of the inspection target region may be separately created. With this, a damage diagram in which all fissuring is recorded can be displayed as necessary. Alternatively, a damage diagram in which layers are separated for each fissuring type may be created.

Figure 10:
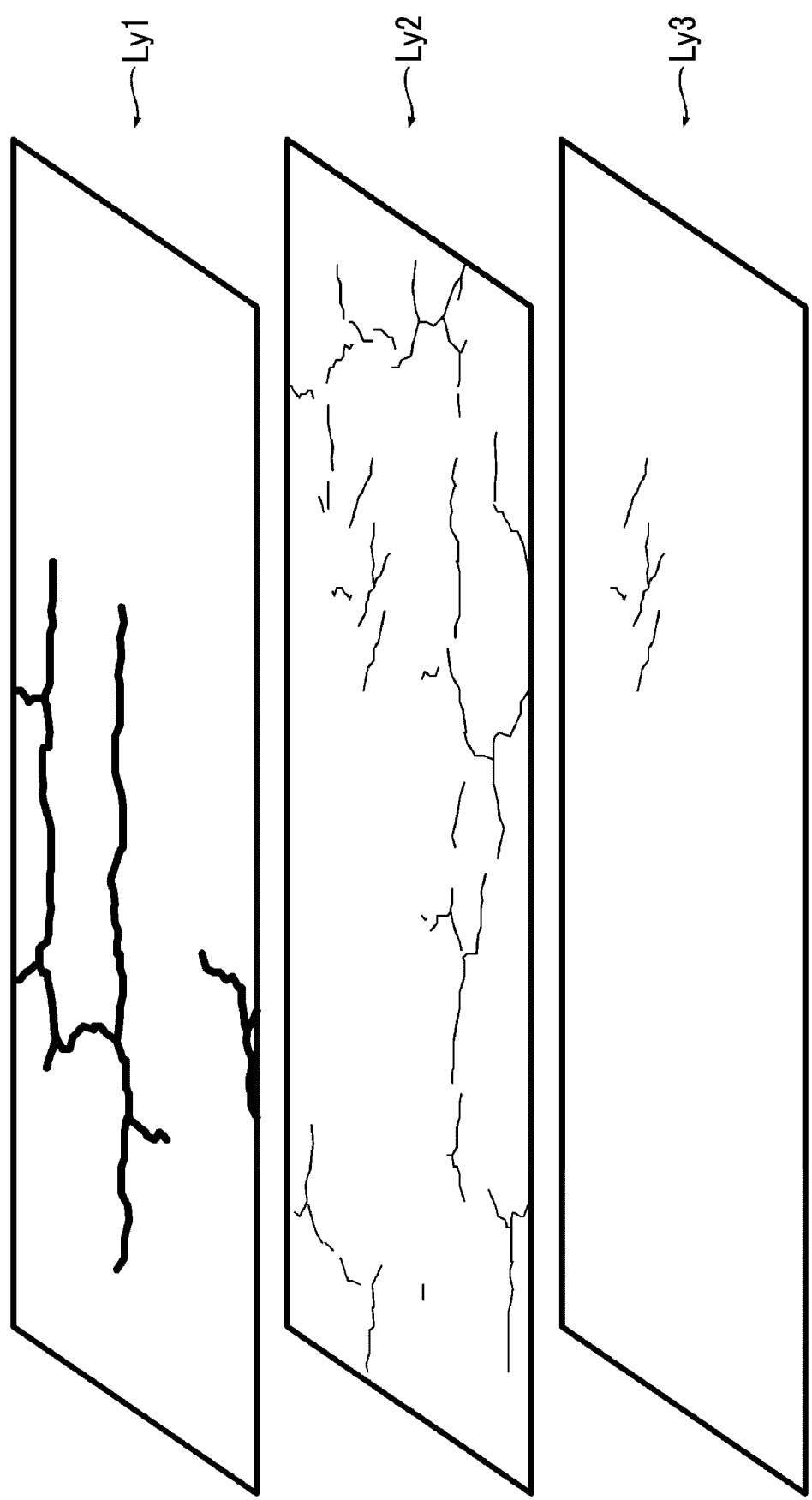
FIG. 10 is a diagram showing an example of a damage diagram generated by separating layers for each fissuring type.

FIG. 10 is a diagram showing an example of a damage diagram generated by separating layers for each fissuring type.

FIG. 10 shows an example of a case where the damage diagram is composed of three layers (a first layer Ly1 to a third layer Ly3). The first layer Ly1 is composed of a layer in which fissuring with a width of 0.2 mm or more is recorded. The second layer Ly2 is composed of a layer in which fissuring with a width of 0.1 mm or more and less than 0.2 mm is recorded. The third layer Ly3 is composed of a layer in which fissuring with a width of 0.1 mm or more and less than 0.2 mm is recorded only for the internal damage region. With the damage diagram having such a configuration, for example, the first layer Ly1 and the third layer Ly3 are selected and displayed, whereby a damage diagram is displayed in which fissuring with a width of 0.1 mm or more is displayed for the internal damage region and fissuring with a width of 0.2 mm or more is displayed for the other regions. Further, the first layer Ly1 and the second layer Ly2 are selected and displayed, whereby a damage diagram is displayed in which fissuring with a width of 0.1 mm or more is displayed in all regions.

Further, for example, the detected fissuring may be individually numbered, and width information may be managed for each fissuring.

[Unit that Non-Destructively Measures Internal State of Inspection Target Region]

In the above embodiment, a configuration is adopted in which the image that visualizes the internal state of the structure is captured by the millimeter wave camera and the internal state of the structure is non-destructively measured. The unit and method of non-destructively measuring the internal state of the structure are not limited thereto. For example, a configuration can also be adopted in which the internal state of the structure is measured using a device (such as a microwave imaging device and a terahertz imaging device) that visualizes the internal state using an electromagnetic wave, such as a microwave and a terahertz wave (electromagnetic wave radar method). Further, a configuration can also be adopted in which the internal state of the structure is measured using a device (such as an ultrasonic imaging device) that visualizes the internal state using an ultrasonic wave (a so-called ultrasonic method). In addition, a configuration can be adopted in which the internal state of the structure is measured by adopting a well-known non-destructive exploration method, such as an infrared photographic method, an X-ray angiographic method, and a non-contact acoustic exploration method.

[Unit that Acquires Information on Internal Damage Region]

In the above embodiment, a configuration is adopted in which the user manually inputs the internal damage region, but the method of acquiring information on the internal damage region is not limited thereto. For example, a configuration can also be adopted in which a region having internal damage is indicated by chalk or the like, and information on the internal damage region is acquired by automatically recognizing the region indicated by chalk or the like from the visible light image. Further, a configuration can also be adopted in which the information on the internal damage region is acquired by acquiring the information of the damage diagram in which the information on the internal damage region is recorded. Furthermore, a configuration can also be adopted in which the information on the internal damage region is acquired by acquiring the captured image data in a case where the internal state of the structure is measured by capturing the image that visualizes the internal state of the structure. In this case, the information on the internal damage region is automatically acquired by analyzing the image that visualizes the internal state of the structure and detecting the damage region.

[Inspection Target]

The present invention is particularly effective in a case where a structure made of reinforced concrete, such as a bridge, a tunnel, a dam, and a building, is inspected. However, the application of the present invention is not limited thereto. In addition, for example, the same can also be applied to a case where a structure whose surface includes a tile, a brick, or the like is inspected.

Further, in the above embodiment, a case where the delamination of concrete is inspected as the internal damage to the structure has been described as an example, but the type of internal damage as the inspection target is not limited thereto.

[Imaging Method]

Imaging with the visible light camera can also be performed by, for example, mounting the visible light camera on an unmanned aerial vehicle (so-called drone), an unmanned traveling vehicle, or the like.

Further, a configuration can also be adopted in which imaging is automatically performed in a case where the visible light camera is mounted on the unmanned aerial vehicle or the like to image the inspection target. For example, a configuration may be adopted in which the unmanned aerial vehicle automatically flies along a predetermined route and images the inspection target.

Similarly, in a case of non-destructively measuring the internal state of the structure by capturing the image that visualizes the internal state of the structure, imaging can also be performed by mounting a camera (imaging device) on the unmanned aerial vehicle, an unmanned traveling vehicle, or the like.

[System Configuration]

In the above embodiment, the damage diagram creation support device is realized by a so-called stand-alone computer, but the damage diagram creation support device can also be realized by a client-server system. For example, a configuration may be adopted in which the functions, such as the fissuring detection unit 10B, the panorama composition unit 10C, the internal damage region information acquisition unit 10D, and the damage diagram creation unit 10E, are realized by the server. In this case, the client terminal is provided with a function of transmitting images to the server, a function of receiving results (such as a panorama composite image and damage diagram data) from the server, and the like.

Further, the hardware that realizes the damage diagram creation support device can be composed of various processors. The various processors include, for example, a CPU and/or a graphic processing unit (GPU) which is a general-purpose processor that executes a program to function as various processing units, a programmable logic device (PLD), such as a field programmable gate array (FPGA), which is a processor having a changeable circuit configuration after manufacture, a dedicated electric circuit, such as an application specific integrated circuit (ASIC), which is a processor having a dedicated circuit configuration designed to execute specific processing. One processing unit constituting an inspection support device may be composed of one of the above various processors or two or more of the above various processors of the same type or different types. For example, one processing unit may be composed of a combination of a plurality of FPGAs or a combination of a CPU and an FPGA. Alternatively, a plurality of processing units may be composed of one processor. A first example of the configuration in which a plurality of processing units are composed of one processor includes an aspect in which one or more CPUs and software are combined to constitute one processor, and the processor functions as the plurality of processing units, as represented by a computer, such as a client or a server. A second example is an aspect in which a processor that realizes the functions of the entire system including a plurality of processing units with one integrated circuit (IC) chip is used, as represented by system on chip (SoC) and the like. As described above, various processing units are composed of one or more of the various processors described above as the hardware structure. Further, more specifically, an electric circuit (circuitry) in which circuit elements, such as semiconductor elements, are combined is used as the hardware structure of these various processors.

EXPLANATION OF REFERENCES

1: floor slab
2: coffer
3: main girder
4: cross-beam
10: damage diagram creation support device
10A: image data acquisition unit
10B: fissuring detection unit
10C: panorama composition unit
10D: internal damage region information acquisition unit
10E: damage diagram creation unit
11: CPU
12: RAM
13: ROM
14: HDD
15: operation unit
16: display unit
16A: screen of the display unit
17: input/output interface
18: communication interface
a: movement direction of imaging
F: frame surrounding an internal damage region
IM: visible light image
L1: line tracing fissuring with a width of 0.2 mm or more
L2: line tracing fissuring with a width of 0.1 mm or more and less than 0.2 mm
Ly1: first layer of a damage diagram
Ly2: second layer of the damage diagram
Ly3: third layer of the damage diagram
P: pointer
W: internal damage to the structure
S1 to S3: procedure from inspection to creation of the damage diagram
S31 to S35: damage diagram creation procedure through the damage diagram creation support device

What is claimed is:

1. A damage diagram creation support method comprising:
   acquiring information on a region having internal damage to a structure within an inspection target region;
   acquiring a visible light image obtained by imaging the inspection target region with a visible light camera;
   detecting fissuring appearing on a surface of the structure in the visible light image; and
   creating a damage diagram in which the fissuring detected in the visible light image is traced, in which the damage diagram is created by tracing fissuring with a width greater than or equal to a first threshold value in a region except for the region having internal damage and by tracing fissuring with a width greater than or equal to a second threshold value, which is smaller than the first threshold value, in the region having internal damage.

2. The damage diagram creation support method according to claim 1,
   wherein the visible light image is an image captured with a pixel resolution capable of detecting fissuring with at least a width of up to 0.1 mm,
   the first threshold value is 0.2 mm, and
   the second threshold value is 0.1 mm.

3. The damage diagram creation support method according to claim 1, further comprising:
   detecting the region having internal damage by non-destructively measuring an internal state of the inspection target region.

4. The damage diagram creation support method according to claim 3,
   wherein the internal state of the inspection target region is non-destructively measured by capturing an image that visualizes the internal state of the inspection target region.

5. The damage diagram creation support method according to claim 4,
   wherein the image that visualizes the internal state of the inspection target region is captured using an electromagnetic wave or an ultrasonic wave.

6. The damage diagram creation support method according to claim 5,
   wherein the image that visualizes the internal state of the inspection target region is captured using a millimeter wave, a microwave, or a terahertz wave.

7. The damage diagram creation support method according to claim 2,
   wherein an internal state of the inspection target region is measured by a non-contact acoustic exploration method.

8. The damage diagram creation support method according to claim 1,
   wherein a delamination region is detected as the region having internal damage to the structure.

9. A damage diagram creation support device that supports creation of a damage diagram in which fissuring appearing on a surface of a structure is recorded, the device comprising a processor configured to perform:
  processing of acquiring information on a region having internal damage to the structure within an inspection target region;
  processing of acquiring a visible light image obtained by imaging the inspection target region with a visible light camera;
  processing of detecting the fissuring appearing on the surface of the structure in the visible light image; and
  processing of creating a damage diagram in which the fissuring detected in the visible light image is traced, in which the damage diagram is created by tracing fissuring with a width greater than or equal to a first threshold value in a region except for the region having internal damage and by tracing fissuring with a width greater than or equal to a second threshold value, which is smaller than the first threshold value, in the region having internal damage.

10. The damage diagram creation support device according to claim 9,
  wherein the visible light image is an image captured with a pixel resolution capable of detecting fissuring with at least a width of up to 0.1 mm,
  the first threshold value is 0.2 mm, and
  the second threshold value is 0.1 mm.

* * * * *